United States Patent [19]
Depping et al.

[11] Patent Number: 6,095,948
[45] Date of Patent: Aug. 1, 2000

[54] METHOD OF OPERATING A VEHICLE TRANSMISSION

[75] Inventors: Herbert Depping, Giengen; Wilfried Maier, Heidenheim; Erwin Rotter, Nattheim; Friedrich Häberle, Heidenheim; Thomas Schönhaar, Königsbronn, all of Germany

[73] Assignee: Playtex Products, Inc., Westport, Conn.

[21] Appl. No.: 09/029,449

[22] PCT Filed: Aug. 2, 1996

[86] PCT No.: PCT/EP96/03777

§ 371 Date: Oct. 21, 1998

§ 102(e) Date: Oct. 21, 1998

[87] PCT Pub. No.: WO97/08479

PCT Pub. Date: Mar. 6, 1997

[30] Foreign Application Priority Data

Aug. 29, 1995 [DE] Germany .............................. 195 31 675

[51] Int. Cl.[7] .................................................. F16H 61/06
[52] U.S. Cl. ........................... 477/143; 477/154; 477/155
[58] Field of Search ........................................... 477/143, 154, 477/155

[56] References Cited

U.S. PATENT DOCUMENTS

| 4,967,385 | 10/1990 | Brekkestran et al. | 477/155 X |
| 5,072,390 | 12/1991 | Lentz et al. | 477/154 X |
| 5,547,437 | 8/1996 | Kamada et al. | 477/143 |

FOREIGN PATENT DOCUMENTS

| 0231593 | 8/1987 | European Pat. Off. |
| 0176750 | 7/1992 | European Pat. Off. |
| 0435372 | 11/1994 | European Pat. Off. |
| 1932986 | 11/1977 | Germany |
| 3205767 | 11/1990 | Germany |

*Primary Examiner*—Sherry L. Estremsky
*Attorney, Agent, or Firm*—Ohlandt, Greeley, Ruggiero & Perle L.L.P.

[57] ABSTRACT

A process is provided for operating a vehicle transmission with preferably electrohydraulically actuatable friction elements for shifting between different transmission steps, in a vehicle with at least one drive engine in which an actual value of at least one of the quantities characterizing the shift process is determined for each shift process, which actual value is compared with a theoretical value that can be established and stored. When the actual value deviates from the theoretical value, a regulated quantity for at least direct influencing is changed by a correction value that can be established. For each shift process, the time duration for the output of a gear shift signal up to the beginning of the synchronization process and/or the change of the drive rpm during this time period is determined as a first and/or second actual value of the quantity characterizing the process. When the time period up to the beginning of the synchronization process deviates from the pre-given theoretical time period or if the drive rpm change given in advance is not achieved after a shift process, the initial pressure value is changed by the correction value in order to introduce the necessary pressure force of the coupling components that can be coupled together in a force-interlocking manner.

21 Claims, 2 Drawing Sheets

METHOD OF OPERATING A VEHICLE TRANSMISSION

BACKGROUND OF THE INVENTION

1. Field of the Invention

The invention concerns a process for operating a vehicle transmission, particularly for control of an automatic vehicle transmission, and also a control or regulating system for conducting the process.

2. Description of Prior Art

Processes for operating or for control of automatic vehicle transmissions are already known from the following documents:

(1) DE 1,932,986 C
(2) DE 3,205,767 C
(3) EP 0 176,750 B2
(4) EP 0 435,372 B1

In automatic vehicle transmissions, it is known how to adjust the pressure of the operating medium, which serves for actuating the friction elements of the transmission, as a function of different operating parameters of the motor vehicle. In the process disclosed in DE 1,932,986 C, pressure is adjusted by means of an electronic control via pre-given pressure characteristics. An equilibration of parameter changes as a consequence of serial scatter or alternation effects cannot be achieved thereby. Friction values of discs, characteristics of pressure controllers or springs, as well as the momentum yielded by the engine, however, are continually subjected to this type of scatter, whereby, on the one hand, fluctuations in the quality of shifting have been produced, but on the other hand, high requirements are placed on tolerances of the parts applied or used. This has a very unfavorable effect on cost.

In the design disclosed in DE 3,205,767 C, closed control circuits were used. These, however, have the disadvantage that a regulated quantity calculating the necessary dynamics is required. Basically, stability problems are to be expected in the control system of engine transmissions due to the dead times present in the entire operating leg, and thus clear repetivie errors must be taken into the bargain before the control can be correctly engaged, and this is reflected in poor comfort during shifting.

A pressure controller for an automatic transmission control for vehicles is known from DE 3,025,054 A1, in which a desired shift time is applied for changing gears as a function of the load. The actually occurring shift time is measured and compared with the stored theoretical shift time. Fluctuations occur hereby, a correcting value is entered in a correcting register, which is added in a change of gear to pressure characteristics, which originally are stored in memory and serve for the purpose of controlling the pressure during the change in gear.

In the case of a process for the electronic control of an automatic vehicle transmission, as described in EP 0 176, 750 B2, correcting values are calculated and applied as a function of the load and rpm, so that an exact adaptation to different load [and] rpm conditions can be produced. The theoretical and actual values for the characterizing quantities as well as the correction values formed are placed in load-rpm characteristic diagrams, whereby the actual values are formed by taking the mean of the individual values from several shift processes, so that the previous correction value is maintained until the averaging process is completed, and after conducting the correction, the actual values for the mean are referred to the theoretical values for modifying the correction value.

A process is described in EP 0 435,371 B1 for controlling the change in an automatic transmission of a vehicle from a torque transmission device operated by fluid pressure and transmitting reduced torque, which device is assigned to low speed conditions, up to a torque transmission device operated by fluid pressure and transmitting an increasing torque, which [device] is assigned to high speed conditions, if the engine choke is essentially closed. The outgoing torque transmission device is thus simultaneously or essentially simultaneously disengaged when the incoming torque transmission device is engaged. The transmission has an input, an output, and a turbine, which is coupled with the drive engine by means of the input. The process described in this publication thus comprises the following named steps. The filling trough is applied at the incoming torque transmission device for a [certain] filling time in order to fill the incoming torque transmission device essentially with operating fluid. The turbine speed runup is detected on the basis of an initial slippage of the torque transmission device transmitting the reduced torque, and a synchronization of the incoming torque transmission device on the basis of the turbine speed and of the output speed is established, and the change is then completed when synchronization is detected. Thus a lower pressure is applied to the outgoing torque transmission device for a time that is less than the filling time and then the outgoing torque transmission device is emptied of operating fluid. If a turbine speed runup is detected, a passage through one control loop is produced. With this passage, a slippage profile is generated, which represents the desired slippage during the passage. The slippage of the incoming torque transmission device is measured and controlled, in order to control the slippage of the incoming torque transmission device on the basis of the slippage speed profile.

The known solutions for influencing the quality of shifting in an automatic transmission are essentially characterized by a high expenditure for control and regulation technology. Further, in several variants, no immediate influencing of the shift quality is possible, on the basis of the secondary control strategy. Further, in the case of automatic transmissions, despite the influencing of the control pressure as a function of the determined travel characteristic values, only unsatisfactory results are obtained relative to quality of shifting.

The invention thus takes on the task of avoiding the named disadvantages and achieving a simple, automatic or self-learning adaptation of the shift processes under different operating conditions.

According to the invention, while not maintaining a specific time that can be given in advance for the beginning of the synchronization process or not maintaining a defined engine rpm change, the initial pressure value is adapted for introducing the necessary application force of the coupling parts that can be coupled together in a force-interlocking manner. In the case of these asynchronously shiftable couplings that usually transmit mechanically, at least two friction forces are pressed against one another, whereby a necessary friction for torque transmission is formed. Different basic geometrical forms are considered for use as the friction surfaces, for example friction discs, spherical and drum couplings, or the parallel connection of several friction units, for example, disc coupling. The torque that can be transmitted by friction in the case of these couplings that operate in a force-interlocking manner thus essentially depends, in addition to the application force, on the coefficient of friction as well as the number of pairs of friction surfaces. In a shift process, shiftable friction couplings are thus primary side and secondary side, i.e., input and output sides of the coupling, joined together by means of friction surfaces. Since the friction coefficient $\mu$ essentially changes during the slipping process as a consequence of the action of lubricant and heating, the course of the torque to be expected theoretically does not occur in practice. However, this course serves as the basis for the approximate calculation of slipping time and friction work. The slipping moment of the coupling acts as an acceleration moment and must also introduce the possibly acting effective moment. Since the friction work necessary in the shift process is also essentially converted to heat energy and thus leads to the heating of the coupling, and thus the friction surfaces are not disturbed as a consequence of the adjusting temperatures, limiting values are given in advance for the duration of slippage time at specific rpm values, depending on the coupling type and size. Too long a slippage time is reflected by an increased load of the friction elements, which leads to an increased wear and to an increased requirement for shift force.

According to the invention, the time for adjusting the control pressure value and thus also the time up to the beginning of the synchronization process is influenced by influencing the initial pressure value. This makes it possible to maintain a specific total time value for the shift process and simultaneously to also essentially improve the quality of shifting. The adaption of the initial pressure value according to the invention makes it possible to keep the load on the disc small.

For first-time operation, preferably for the first shift, approximately double pressure correction values are used. This assures a rapid adaptation of the shift pressure curve to the vehicle and the travel conditions. The correction values themselves may be stored in RAM or with larger deviations from the actually stored value also in EEPROM. This means that the last pressure correction values will be retained even after shutting off the ignition. Further, there is the possibility of blocking the adaptation, in case of errors in the sensory device, e.g., in the rpm sensor or load indicator. The shifting may be conducted with the control pressure characteristic fields entered in the EEPROM.

Essential advantages with the use of the adaption according to the invention consist of the fact that the control devices are independent of the transmission, and an adaptation on the test stand, which is economically very expensive, can be dispensed with. Further, an improved quality of shifting can be made possible by consideration of transmission, engine and vehicle parameters, in combination with maintaining a time given in advance up to the synchronization process for each load indicator value.

The adaption makes possible a uniform shift quality over the entire lifetime of the transmission despite variable operating conditions.

DESCRIPTION OF THE INVENTION

Figure 1:
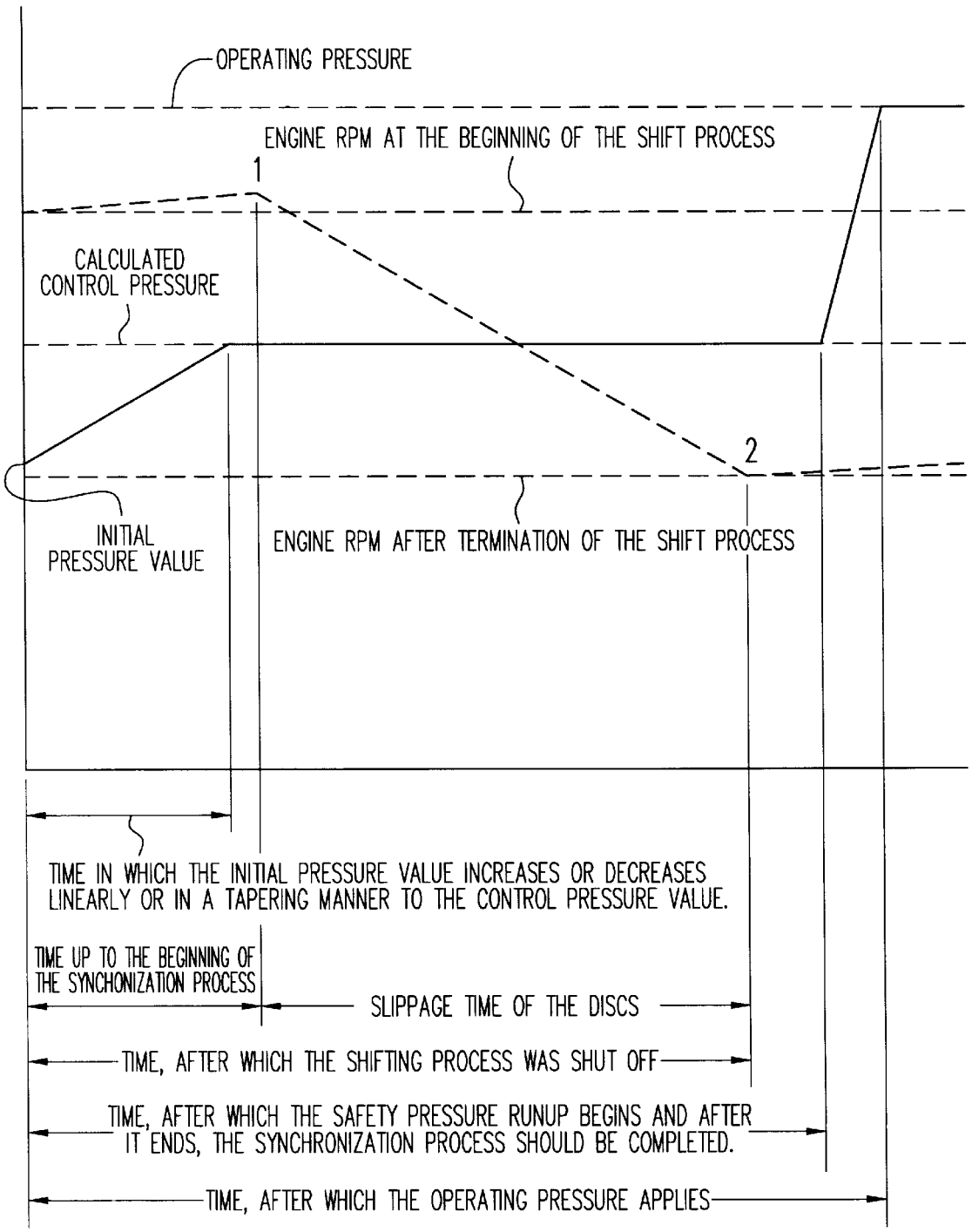
FIG. 1 is a diagram of a control pressure characteristic for upshifting and downshifting in a mechanical transmission.

The FIG. 1 illustrates schematically a control pressure characteristic for upshifting and downshifting in a mechanical transmission. The pressure curve is plotted over time in a diagram for this purpose. The individual values are designated as follows:

USTELLMAX=Operating pressure
PR=Calculated control pressure
PA=Initial pressure value
PATIME=Time in which the initial pressure value increases or decreases linearly or in a tapering manner to the control pressure value.
TMAX=Time after which the safety pressure runup begins and after it ends, the synchronization process should be completed.
TSCHALT-ENDE=Time, after which the operating pressure applies.

The following measurement and control quantities are also essential for the shifting process:

$n_{SYNCHRON1}$=Engine rpm at the beginning of the shift process
$n_{SYNCHRON2}$=Engine rpm after termination of the shift process
$t_{UREAL}$=Time up to the beginning of the synchronization process
$t_{RUTSCH}$=Slippage time of the discs
$t_{SYNCHRON}$=Time, after which the shifting process was shut off.

It can be derived from the diagram that after a gear shift signal has occurred, on the time axis at time point 0, the engine rpm n1 increases until it reaches a free-running point, here point 1, which is to be understood as the point at which the friction elements assigned to the new gear take over the complete moment and release the friction elements assigned to the old gear. From this free-running point, the engine rpm n1 begins to decrease, while simultaneously the friction elements slip. The time until this free-running point is achieved, which corresponds to the beginning of the synchronization process, is designated as $t_{UREAL}$. Associated with this is the slippage time of the friction element $t_{RUTSCH}$. At point 2 in the diagram, both friction elements run synchronously, the new gear is engaged, the friction elements adhere, and the two rpm values are either the same or appropriately identical to the progressive ratio.

Shifting comfort is thus determined by the course of the output [take-off] moment. The moment jump to time point $t_{SYNCHRON}$ will be as small as possible.

The theoretical value for the switching process that is to be maintained is the time up to the beginning of the synchronization process $t_{UREAL}$. The regulated quantity for influencing this timeframe is the initial pressure value PA, [and] the actuator is a device for introducing the initial pressure. In order to conduct an adaptive control, the theoretical values for time until the beginning of the synchronization process $t_{UREAL}$ are listed, for example, in a load/rpm characteristic field. Thus in principle, the raster for the load and rpm classes can be selected at random, whereby the theoretical values may be stored in a constant-value memory and in an electronic transmission control unit. Further, measurement devices are provided, which determine the actual time for each shifting process up to the beginning of the synchronization process. Other influence parameters include the torque per load indicator value, the rpm for shifting as well as the angular momentum of the individual components. If the measured or determined actual value deviates from the theoretical value, a correction value is output at the output of the control device and is effective at the pressure unit. The regulated quantity PA is changed by the correction value. The modified initial pressure value is then stored.

A change of the regulated quantity by a fixed correction value is possible by addition or multiplication.

Other concepts of adapting the time up to the beginning of the synchronization process by changing the initial pressure value are also conceivable. The solution according to the invention, however, makes possible a very simplified control concept.

An upper and a lower limiting value, which must not be overshot or undershot, are established for the initial pressure value PA. Further, a specific amount of deviation between the theoretical and actual values can be viewed as the signal for requiring a replacement of the discs.

It is also possible to configure the shift design extensively so that the control pressure is also adapted and thus the possible slippage time can be influenced. In this case, it may be established that the control pressure value adaption takes precedence ahead of the initial pressure value adaption, or vice versa.

Figure 2:
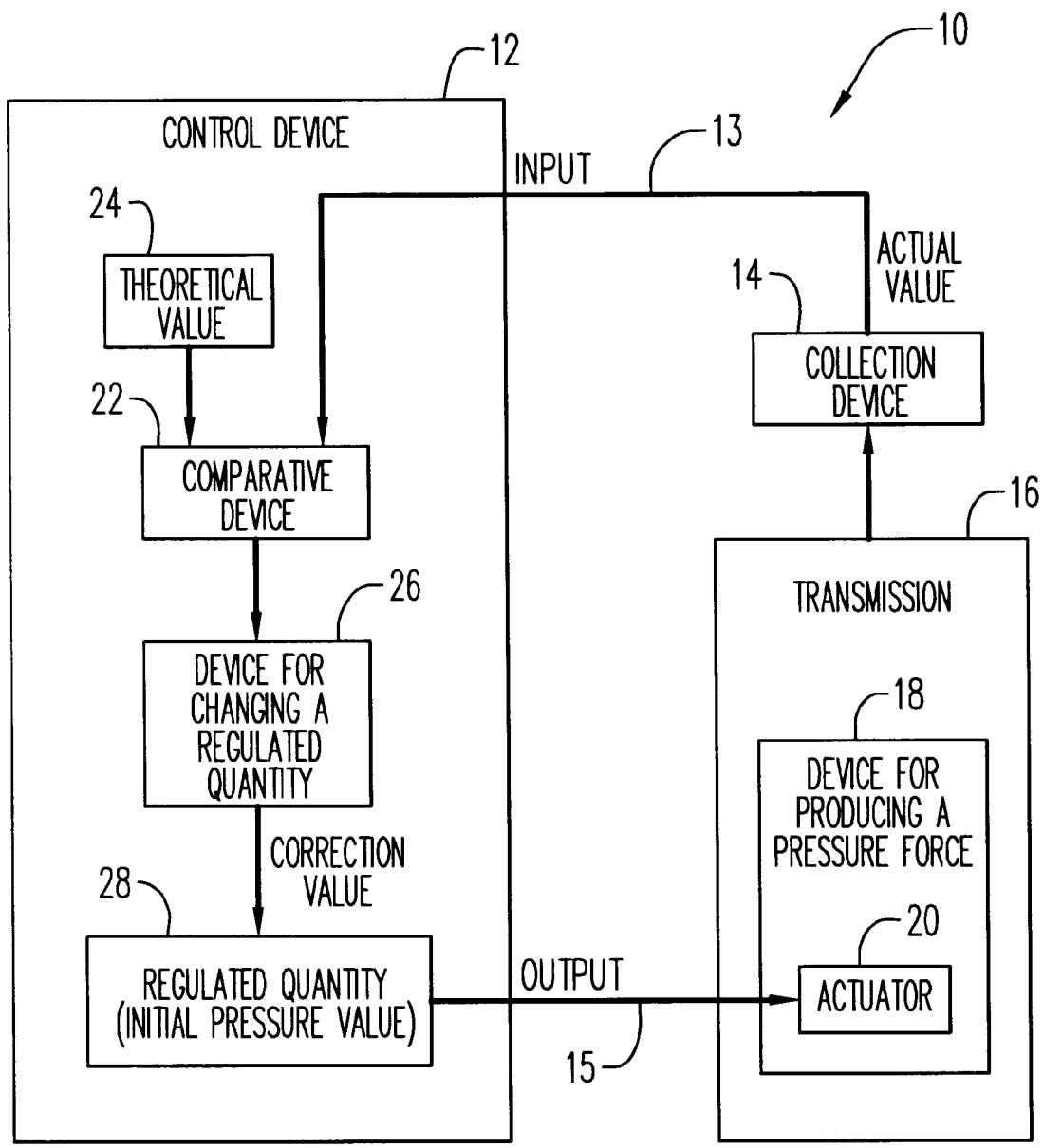
FIG. 2 is a block diagram of a control and regulating system of the invention.

Referring to FIG. 2, a control and regulating system 10 includes a control device 12, a collection device 14 and a transmission 16, particularly a vehicle transmission. Control device 12 has an input 13 and an output 15. Transmission 10 includes a device 18 for introducing the force necessary for actuating and pressing together friction elements for shifting between two different transmission steps for a vehicle with at least one drive engine by means of a pressure agent. Device 18 includes an actuator 20 that is coupled with the output 15 of control device 12. Collection device 14 determines an actual value of one of the quantities characterizing the shift process for each shift process. Collection device 14 is coupled with input 13 of control device 12. Control device 12 includes a comparative device 22 for comparing the actual value determined by collection device 14 with a theoretical value 24 that is established and stored. Control device 12 also includes a device 26 for changing a regulated quantity when the actual value deviates from theoretical value 24 for at least direct influencing by a correction value that is established.

Collection device 14 includes a time measuring device (not shown) that determines the time period from the output of a gear shift signal up to the beginning of the synchronization process as a quantity characterizing the shift process and/or a device for determining the drive rpm values during this time period. The regulated quantity, for example, may be the initial pressure value. When the time period up to the beginning of the synchronization process deviates from a pre-given theoretical time period or when a drive rpm change given in advance is not achieved after a shift process, the initial pressure value is changed by the correction value in order to introduce the necessary pressure force of the coupling components of transmission 16 that can be coupled together in a force-interlocking manner.

What is claimed is:

1. A process for controlling an automatic vehicle transmission with coupling components including electrohydraulically actuatable friction elements for shifting between different transmission steps in a vehicle with at least one drive engine in which an actual value of at least one quantity characterizing a shift process is determined for each said shift process, said actual value is compared with a theoretical value that is pre-given and stored, wherein if said actual value deviates from said theoretical value, a regulated quantity for at least direct influencing said at least one quantity is changed by a correction value that is established, said process comprising:

establishing as said actual value for said at least one quantity, at least one member of the group of (i) the time duration from the output of a gear shift signal up to the beginning of a synchronization process and (ii) the change in drive rpm during said time duration; and changing an initial pressure value by said correction value in order to introduce a necessary pressure force of said coupling components that can be coupled together in a force-interlocking manner if at least one of the following events occurs: (i) said time duration up to the beginning of the synchronization process deviates from a pre-given theoretical time period or (ii) a pre-given drive rpm change is not achieved after said shift process.

2. The process according to claim 1, wherein said initial pressure value is changed by said correction value in order to introduce said necessary pressure force of said coupling components that can be coupled together in a force-interlocking manner.

3. The process according to claim 2, wherein said actual value is a first one of a plurality of actual values, wherein said first actual value is said time duration, wherein a second one of said plurality of actual values is said change in drive rpm, and wherein a third one of said plurality of actual values is the slippage time of said coupling components, wherein said theoretical value is a first one of a plurality of theoretical values, wherein said second and third actual values are compared with second and third ones of said plurality of theoretical values, respectively, and wherein the regulated quantity is adapted as a control pressure value for at least direct influencing of said slippage time when said third actual value deviates from said third theoretical value.

4. The process according to claim 3, wherein said change of said control pressure value takes precedence over said change in said initial pressure value.

5. The process according to claim 3, wherein said change of said initial pressure value takes precedence over said change of said control pressure value.

6. The process according to claim 3, wherein said change of said control pressure value takes precedence over said change in said initial pressure value.

7. The process according to claim 2, wherein said initial pressure value is changed by a fixed correction value and the newly established initial pressure value is then stored.

8. The process according to claim 7, wherein said actual value is a first one of a plurality of actual values, wherein said first actual value is said time duration, wherein a second one of said plurality of actual values is said change in drive rpm, and wherein a third one of said plurality of actual values is the slippage time of said coupling components, wherein said theoretical value is a first one of a plurality of theoretical values, wherein said second and third actual values are compared with second and third ones of said plurality of theoretical values, respectively, and wherein the regulated quantity is adapted as a control pressure value for at least direct influencing of said slippage time when said third actual value deviates from said third theoretical value.

9. The process according to claim 8, wherein said change of said control pressure value takes precedence over said change in said initial pressure value.

10. The process according to claim 8, wherein said change of said initial pressure value takes precedence over said change of said control pressure value.

11. The process according to claim 8, wherein said change of said control pressure value takes precedence over said change in said initial pressure value.

12. The process according to claim 1 wherein said initial pressure value is changed by a fixed correction value to a newly established initial pressure value which is then stored.

13. The process according to claim 12, wherein said actual value is a first one of a plurality of actual values, wherein said first actual value is said time duration, wherein a second one of said plurality of actual values is said change in drive rpm, and wherein a third one of said plurality of actual values is the slippage time of said coupling components, wherein said theoretical value is a first one of a plurality of theoretical values, wherein said second and third actual values are compared with second and third ones of said plurality of theoretical values, respectively, that are established and stored, and wherein the regulated quantity is adapted as a control pressure value for at least direct influencing of said slippage time when said third actual value deviates from said third theoretical value.

14. The process according to claim 13, wherein said control pressure value is modified by a pre-given correction value.

15. The process according to claim 14, wherein said change of said control pressure value takes precedence over said change in said initial pressure value.

16. The process according to claim 14, wherein said change of said initial pressure value takes precedence over said change of said control pressure value.

17. The process according to claim 1, wherein said actual value is a first one of a plurality of actual values, wherein said first actual value is said time duration, wherein a second one of said plurality of actual values is said change in drive rpm, and wherein a third one of said plurality of actual values is the slippage time of said coupling components, wherein said theoretical value is a first one of a plurality of theoretical values, wherein said second and third actual values are compared with second and third ones of said plurality of theoretical values, respectively, and wherein the regulated quantity is adapted as a control pressure value for at least direct influencing of said slippage time when said third actual value deviates from said third theoretical value.

18. The process according to claim 17, wherein said change of said control pressure value takes precedence over said change in said initial pressure value.

19. The process according to claim 17, wherein said change of said initial pressure value takes precedence over said change of said control pressure value.

20. The process according to claim 17, wherein of said control pressure value takes precedence over said change in said initial pressure value.

21. A control and regulating system for a transmission having at least one device for introducing the force necessary for actuating and pressing together friction elements for shifting between two different transmission steps for a vehicle with at least one drive engine by means of a pressure agent, said system comprising:

a control device having a first input and a first output;

a collection device being provided for the determination of an actual value of one of the quantities characterizing the shift process for each shift process that is coupled with said first input of the control device;

an actuator being formed by the collection device, for producing the pressure force, said actuator being connected to said first output of said control device, said control device having a comparative device for comparing said actual value with a theoretical value that is established and stored, said control device having a device for changing a regulated quantity when said actual value deviates from said theoretical value for at least direct influencing said one quantity by a correction value that is established, said collection device having a time measuring device that determines the time period from the output of a gear shift signal up to the beginning of the synchronization process as a quantity characterizing said shift process and/or a device for determining one or more drive rpm values during said period, wherein said regulated quantity is the initial pressure value, whereby when the time period up to the beginning of the synchronization process deviates from a pre-given theoretical time period or when a pre-given change in said drive rpm change is not achieved after a shift process, said initial pressure value is changed by said correction value in order to introduce the necessary pressure force of said coupling components that can be coupled together in a force-interlocking manner.

* * * * *

UNITED STATES PATENT AND TRADEMARK OFFICE
CERTIFICATE OF CORRECTION

PATENT NO. : 6,095,948
APPLICATION NO. : 09/029449
DATED : August 1 2000
INVENTOR(S) : Depping et al.

It is certified that error appears in the above-identified patent and that said Letters Patent is hereby corrected as shown below:

On Title Page
Item 73
The Assignee should be J.M. VOITH GmbH, Heidenheim, Germany.

Signed and Sealed this

Thirty-first Day of July, 2007

JON W. DUDAS
*Director of the United States Patent and Trademark Office*